(12) United States Patent  
Klotzbach et al.

(10) Patent No.: US 11,807,314 B2  
(45) Date of Patent: Nov. 7, 2023

(54) STEERING DEVICE AND STEERING UNIT DEVICE

(71) Applicant: NABTESCO CORPORATION, Tokyo (JP)

(72) Inventors: Stephan Klotzbach, Cologne (DE); Tobias Niermann, Cologne (DE)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/726,299

(22) Filed: Apr. 21, 2022

(65) Prior Publication Data

US 2022/0340197 A1    Oct. 27, 2022

(30) Foreign Application Priority Data

Apr. 23, 2021  (JP) ................................ 2021-073446

(51) Int. Cl.
*B62D 6/00*    (2006.01)
*B62D 5/04*    (2006.01)

(52) U.S. Cl.
CPC ......... *B62D 5/0466* (2013.01); *B62D 5/0409* (2013.01); *B62D 5/0463* (2013.01)

(58) Field of Classification Search
CPC .. B62D 5/0466; B62D 5/0409; B62D 5/0463; B62D 6/00
USPC .......................................................... 701/41
See application file for complete search history.

(56) References Cited

U.S. PATENT DOCUMENTS

| 10,259,489 B2* | 4/2019 | Minamiguchi | B62D 6/00 |
| 10,661,825 B2 | 5/2020 | Tsubaki | |
| 2007/0144814 A1* | 6/2007 | Arnold | B62D 6/008 180/402 |
| 2012/0083972 A1* | 4/2012 | Gruener | B62D 6/008 701/41 |
| 2016/0200354 A1* | 7/2016 | Kimura | B62D 5/0472 701/42 |
| 2018/0118253 A1* | 5/2018 | Minamiguchi | B62D 5/0472 |

(Continued)

FOREIGN PATENT DOCUMENTS

| CN | 104163198 A | 11/2014 |
| DE | 102013110848 A1 | 4/2015 |

(Continued)

OTHER PUBLICATIONS

Notice of Reasons for Rejection dated Jun. 8, 2021, issued in corresponding Japanese Patent Application No. 2021-073446 with English translation (5 pgs.).

(Continued)

*Primary Examiner* — Shardul D Patel
(74) *Attorney, Agent, or Firm* — Pillsbury Winthrop Shaw Pittman, LLP

(57) ABSTRACT

A steering device includes: a steering unit steered by a driver; a drive unit rotating for imparting an auxiliary force to the steering unit; a first control unit calculating a load torque that corresponds to a reaction force from a road surface and is estimated based on a value measured in the steering unit and the drive unit, the first control unit also calculating a target steering torque for the steering unit based on the calculated load torque; and a second control unit calculating the auxiliary force of the drive unit to achieve the target steering torque calculated by the first control unit.

13 Claims, 9 Drawing Sheets

(56) References Cited

U.S. PATENT DOCUMENTS

| | | | |
|---|---|---|---|
| 2019/0308661 A1* | 10/2019 | Naik | B62D 5/0472 |
| 2019/0322315 A1* | 10/2019 | Birsching | B62D 5/062 |
| 2020/0108857 A1* | 4/2020 | Tsubaki | B62D 5/04 |
| 2020/0377149 A1* | 12/2020 | Tagami | B62D 5/0463 |
| 2021/0061344 A1* | 3/2021 | Kitazume | B62D 1/286 |
| 2021/0362774 A1* | 11/2021 | Moreillon | B62D 5/0421 |

FOREIGN PATENT DOCUMENTS

| | | |
|---|---|---|
| EP | 2424767 B1 | 5/2013 |
| EP | 3459825 A1 | 3/2019 |
| JP | 2007-001564 A | 1/2007 |
| JP | 2007-022373 A | 2/2007 |
| JP | 2008-056224 A | 3/2008 |
| JP | 2014-141172 A | 8/2014 |
| JP | 2014-162322 A | 9/2014 |
| JP | 2020-192927 A | 12/2020 |
| WO | 2019/026351 A1 | 2/2019 |
| WO | 2019/171447 A1 | 9/2019 |

OTHER PUBLICATIONS

Notice of Reasons for Rejection dated Oct. 26, 2021 issued in corresponding Japanese Patent Application No. 2021-073446 with English translation (6 pgs.).

Extended European Search Report dated Sep. 13, 2022, issued in corresponding European Patent Application No. 22169211.4 (9 pgs.).

Office Action dated Dec. 27, 2022, issued in corresponding Chinese Patent Application No. 202210430994.5 with English translation (12 pgs.).

Office Action dated Dec. 27, 2022, issued in corresponding Chinese Patent Application No. 104163198 with English translation (12 pgs.).

* cited by examiner

STEERING DEVICE AND STEERING UNIT DEVICE

CROSS-REFERENCE TO RELATED APPLICATIONS

This application is based on and claims the benefit of priority from Japanese Patent Application Serial No. 2021-073446 (filed on Apr. 23, 2021), the contents of which are hereby incorporated by reference in their entirety.

TECHNICAL FIELD

The present disclosure relates to a steering device and a steering unit device.

BACKGROUND

In a steering mechanism of a vehicle, electric power steering for assisting steering with a rotational force of a motor has been known.

An electric power steering device that switches between a manual steering control and an automatic steering control has been known (see, for example, International Publication No. 2019/026351). In the manual steering control, the motor is driven depending on a first motor current command value calculated based on a steering torque. In the automatic steering control, the motor is driven depending on a second motor current command value that is calculated so as to bring an actual steering angle to a target steering angle.

However, the above-mentioned electric power steering device cannot provide an assist torque appropriate for a road surface condition, for example, when the assist torque is calculated only on the input side (steering wheel side).

This means that it may not be possible to properly assist the steering regardless of the road surface condition.

SUMMARY

The present disclosure has been made in view of above, and provides, for example, a steering device and a steering unit device that can appropriately assist steering regardless of road surface conditions.

A steering device according to one aspect of the disclosure includes: a steering unit steered by a driver; a drive unit rotating for imparting an auxiliary force to the steering unit; a first control unit calculating a load torque that corresponds to a reaction force from a road surface and is estimated based on a value measured in the steering unit and the drive unit, the first control unit also calculating a target steering torque for the steering unit based on the calculated load torque; and a second control unit calculating the auxiliary force of the drive unit to achieve the target steering torque calculated by the first control unit.

With this configuration, it is possible to properly assist the steering regardless of the road surface conditions.

In the above steering device, the first control unit may calculate the load torque based on a steering torque required to rotate the steering unit, a steering angular velocity, which is an angular velocity of the steering unit, and a drive torque, which is a torque of the drive unit.

In the above steering device, the second control unit may calculate the auxiliary force of the drive unit based on the load torque, a steering torque required to rotate the steering unit, a steering angular velocity, which is an angular velocity of the steering unit, and a drive angular velocity, which is an angular velocity of the drive unit.

In the above steering device, the load torque may be a torque applied to a pitman arm.

In the above steering device, the first control unit may calculate the target steering torque based on the steering torque corresponding to the reaction force, a restoring torque that returns the steering unit to a neutral position, and a damping torque that controls abrupt steering of the steering unit.

In the above steering device, the first control unit may calculate the load torque on which an operation of compensating for a friction of a speed reducer has been performed.

A steering unit device according to another aspect of the disclosure includes the above steering device, a speed reducer, and a control unit controlling the steering device and the speed reducer.

Advantageous Effects

With the above steering device or steering unit device, it is possible to properly assist the steering regardless of the road surface conditions.

DESCRIPTION OF EXAMPLE EMBODIMENTS

The embodiments of the disclosure will be hereinafter described with reference to the drawings.

Figure 1:
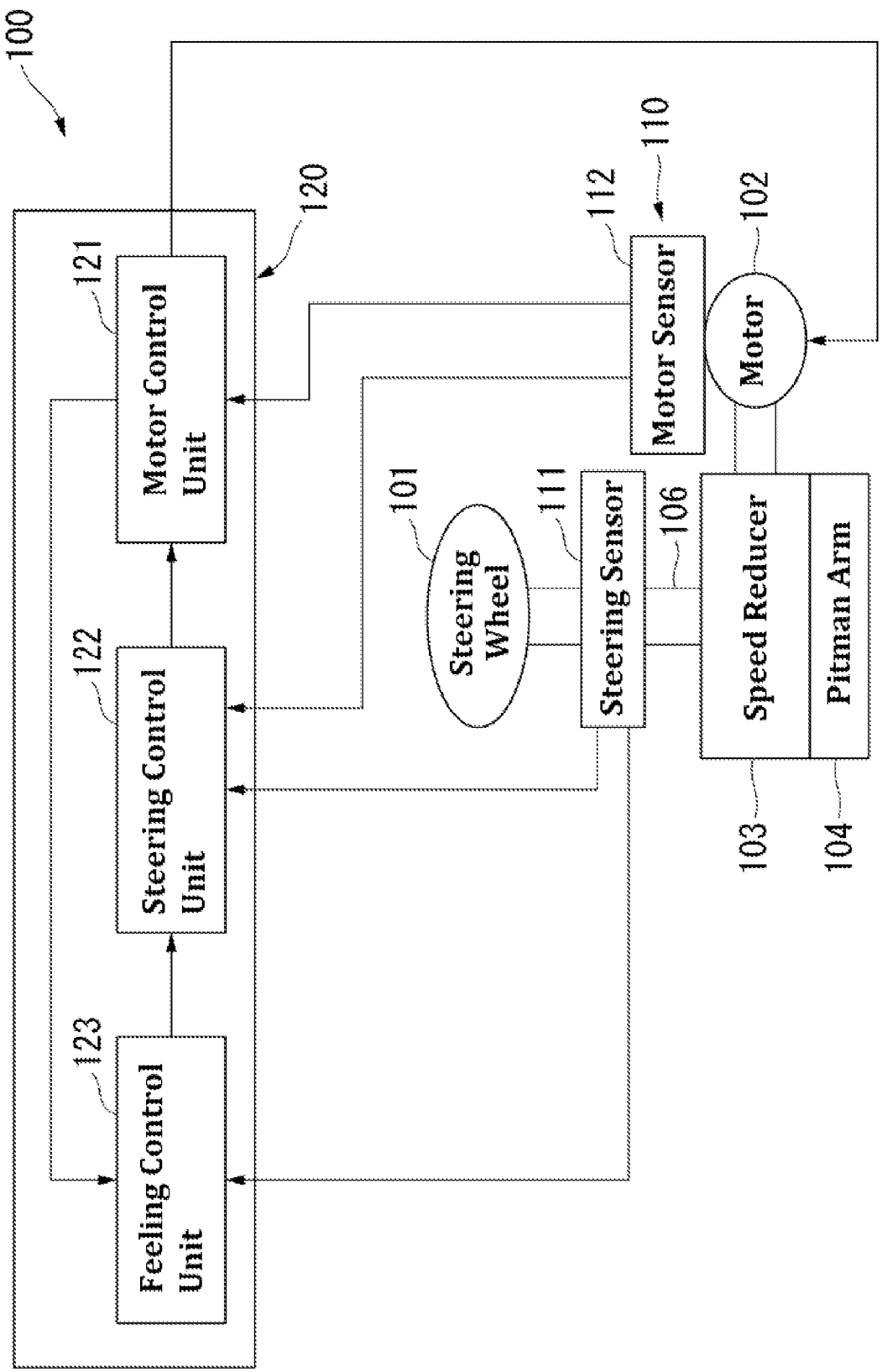
FIG. 1 illustrates a configuration example of a steering unit device 100 according to an embodiment of the disclosure.

FIG. 1 illustrates a configuration example of a steering unit device 100 according to an embodiment of the disclosure. The steering unit device 100 is an electric power steering system mounted on a vehicle. The vehicles in the embodiment are large commercial vehicles such as buses or trucks. A speed reducer 103 in the electric power steering may increase friction, and a driver of the vehicle may be unable to feel road conditions and unable to maneuver the vehicle well. Particularly in large commercial vehicles, the friction of the reducer 103 is large, and it is desirable to configure the control to provide the driver with a steering feeling. The steering unit device 100 according to the embodiment is most effective when used in large commercial vehicles, but it can also be used in passenger vehicles.

The steering unit device 100 includes a steering wheel 101 (an example of a steering unit), a motor 102 (an example of a drive unit), a speed reducer 103, a pitman arm 104, various sensors 110, and a control unit 120. A steering device is formed by the steering wheel 101, the motor 102, and the control unit 120.

Figure 4:
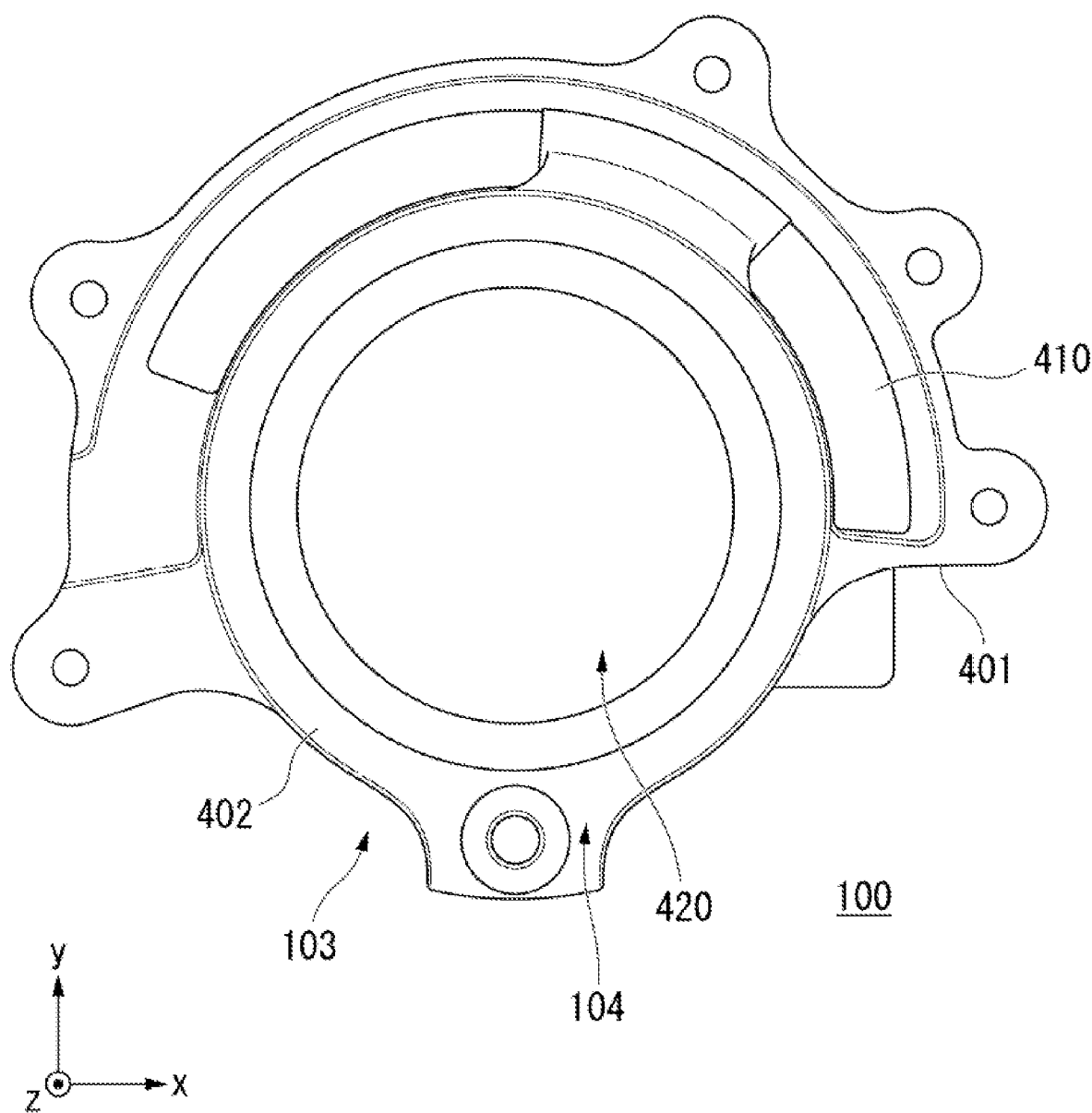
FIG. 4 is an explanatory diagram showing a configuration example of a speed reducer 103 and a pitman arm 104.

The steering wheel 101 is a steering wheel operated by the driver. The motor 102 generates an assist torque (auxiliary force) that assists steering. The steering wheel 101 transmits a steering torque to a steering shaft 106. The steering torque is inputted to an input portion of the speed reducer 103. The speed reducer 103 combines the inputted steering torque and the assist torque by the motor 102, and transmits the combined torque to the pitman arm 104 and following steering mechanism. The pitman arm 104 is an output arm connected to the speed reducer 103 and rotated by the combined torque combined by the speed reducer 103. As shown in FIG. 4, the output portion (case or shaft) of the speed reducer 103 and the pitman arm 104 are integrally formed with each other.

A configuration example of the speed reducer 103 and the pitman arm 104 according to the embodiment will be now described with reference to FIG. 4. FIG. 4 is an explanatory diagram showing a configuration example of the speed reducer 103 and the pitman arm 104. As shown in FIG. 4, a fixing member 401 for fixing the speed reducer to an object is provided on one surface side of the speed reducer 103. On the other surface 420 side of the speed reducer 103, a cylindrical output portion 402 that rotates relative to the fixing member 401 and outputs a rotational force is provided. The output portion 402 has the pitman arm 104 that projects in the radial direction and rotates around a central axis (z axis) in the circumferential direction. The pitman arm 104 is connected to, for example, the steering device and steers wheels according to a rotational movement. Since the pitman arm 104 is provided in the circumferential direction of the output portion 402, it is possible to reduce the width of the steering unit device 100 along the central axis direction and reduce its size.

Referring again to FIG. 2, the various sensors 110 include a steering sensor 111, a motor sensor 112, and a speed sensor 113 (see FIG. 2). The control unit 120 controls the steering device and the speed reducer 103. The control unit 120 includes a motor control unit 121, a steering control unit 122 (an example of a second control unit), and a feeling control unit 123 (an example of a first control unit). The control unit 120 may be implemented by using, for example, an ECU (Electronic Control Unit).

These components are each implemented by executing programs (software), for example, by a hardware processor such as a CPU (central processing unit). A part or all of three components may be implemented by using hardware (including circuitry) such as an LSI (large scale integrated circuit), an ASIC (application specific integrated circuit), an FPGA (field-programmable gate array), and a GPU (graphics processing unit) or may be implemented by the combination of software and hardware. The program may be stored in advance in a storage device (not shown) such as a HDD or flash memory, or it may be stored in a removable recording medium such as a DVD or CD-ROM and installed in the HDD or flash memory when the recording medium is connected to a drive device.

The steering sensor 111 detects a steering torque, steering angle, and steering angular velocity of the steering wheel 101. The steering angular velocity detected by the steering sensor 111 is specifically calculated by the CPU based on the steering angle. The motor sensor 112 detects a motor torque and motor angular velocity of the motor 102. The motor torque detected by the motor sensor 112 is specifically calculated by the CPU based on a current value of the motor 102. Further, the motor angular velocity detected by the motor sensor 112 is calculated based on the position of the motor 102. The speed sensor 113 detects the speed of the vehicle.

The motor control unit 121 controls the rotation of the motor 102 based on control of the steering control unit 122. The steering control unit 122 controls an output torque of the motor 102 based on detection result from the steering sensor 111. The motor 102 generates the assist torque under control of the motor control unit 121 and the steering control unit 122. As described above, the steering of the steering wheel 101 operated by the driver is assisted by the assist torque of the motor 102. The steering control unit 122 performs feedback control to adjust the assist torque of the motor 102 to a predetermined assist torque.

In conventional methods, the calculated torque command value has been often adjusted. Whereas in the embodiment of the present disclosure, the control is separated into the feeling control unit 123 and the steering control unit 122, and a predetermined steering torque is set for the steering control unit 122 to perform torque control.

The feeling control unit 123 calculates a target steering torque for assisting steering so that the steering torque of the steering wheel 101 becomes the predetermined steering torque irrespective of the road surface reaction force. The feeling control unit 123 outputs the calculated target steering torque to the steering control unit 122. The steering control unit 122 calculates a target motor torque based on the target steering torque outputted by the feeling control unit 123, and outputs the target motor torque to the motor control unit 121.

<Various Information Inputted to or Outputted to Control Unit 120>

Figure 2:
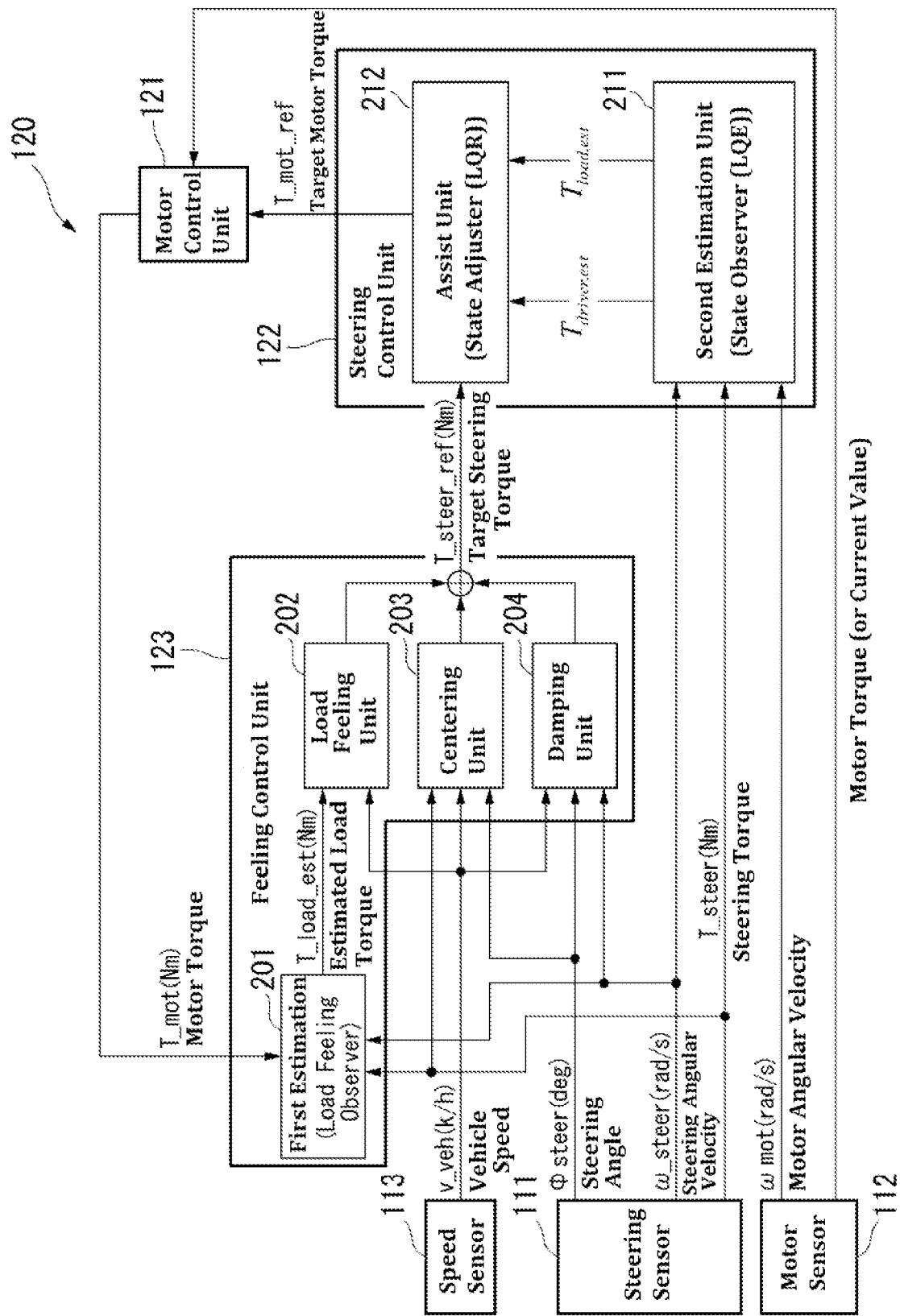
FIG. 2 is an explanatory diagram showing an example of various information inputted to or outputted from a control unit 120.

FIG. 2 is an explanatory diagram showing an example of various information inputted to or outputted from the control unit 120. The feeling control unit 123 will be first described. The feeling control unit 123 includes a first estimation unit 201, a load feeling unit 202, a centering unit 203, and a damping unit 204. The information inputted to each unit will be hereunder described.

In the figures, subscript notations of detected values are listed and described below.

"mot": Value related to the motor 102
"steer": Value related to the steering wheel 101
"driver": Value related to the driver
"load": Value related to the load
"tb": Value related to a torsion bar
"ref": Target value
"est": Estimated value
Values with no subscript of "ref" or "est" are measured values.

The motor torque $T_{mot}$ (Nm) outputted from the motor control unit 121, the steering angular velocity $\omega_{steer}$ (rad/s), and the steering torque $T_{steer}$ (Nm) detected by the steering sensor 111 are inputted to the first estimation unit 201. The first estimation unit 201 calculates an estimated load torque $T_{load\_est}$ (Nm) based on the inputted motor torque $T_{mot}$, steering angular velocity $\omega_{steer}$, and steering torque $T_{steer}$. The calculation (operation) of the estimated load torque $T_{load\_est}$ will be described later.

To the load feeling unit 202, the estimated load torque $T_{load\_est}$ (Nm) outputted from the first estimation unit 201 and the speed of the vehicle $V_{veh}$ (km/h) detected by the speed sensor 113 are inputted. The load feeling unit 202 obtains a target value of the load feeling torque based on the inputted estimated load torque $T_{load\_est}$ and the velocity $V_{veh}$. The target value of the load feeling torque is a value that conveys to the driver a sense of the force (reaction force from the road surface) acting on the tires. The load feeling torque is also a torque that depends on the vehicle speed.

A steering angle $\varphi_{steer}$ (degree) and the steering torque $T_{steer}$ (Nm) detected by the steering sensor 111, and the speed $V_{veh}$ (km/h) detected by the speed sensor 113 are inputted to the centering unit 203. The centering unit 203 obtains a target value of a centering torque (restoring torque) based on the inputted steering angle $\varphi_{steer}$, steering angular velocity $\omega_{steer}$, and speed $V_{veh}$. The centering torque is a force that tries to return the steering wheel 101 to the center position.

In the embodiment, a high friction speed reducer 103 is used. This causes a high back-drive torque, which may prevent the steering wheel from returning to the center position easily. To address this, the centering torque is applied to control the steering wheel 101 so that the steering wheel 101 returns to the center position even if the back drive torque is applied. The centering torque is a torque that depends on the vehicle speed.

The steering angle $\varphi_{steer}$ (degree) and steering angular velocity $\omega_{steer}$ (rad/s) detected by the steering sensor 111, and the speed $V_{veh}$ (km/h) detected by the speed sensor 113 are inputted to the damping unit 204. The damping unit 204 obtains a target value of a damping torque based on the inputted steering angle $\varphi_{steer}$, steering angular velocity $\omega_{steer}$, and speed $V_{veh}$. The damping torque is a force that generates a moderate amount of steering heaviness during abrupt steering. In other words, the damping torque is a torque that generates a moderate repulsive torque against the abrupt steering wheel operation, and acts as a brake for the steering wheel operation. The term "abrupt steering" means not only the driver's steering to the left or right, but also sudden return to the neutral position. The damping torque is also applied to the steering back to the neutral position. The damping torque is a torque that depends on the vehicle speed.

<Torques Outputted by Units 202 to 204>

Figure 3A:
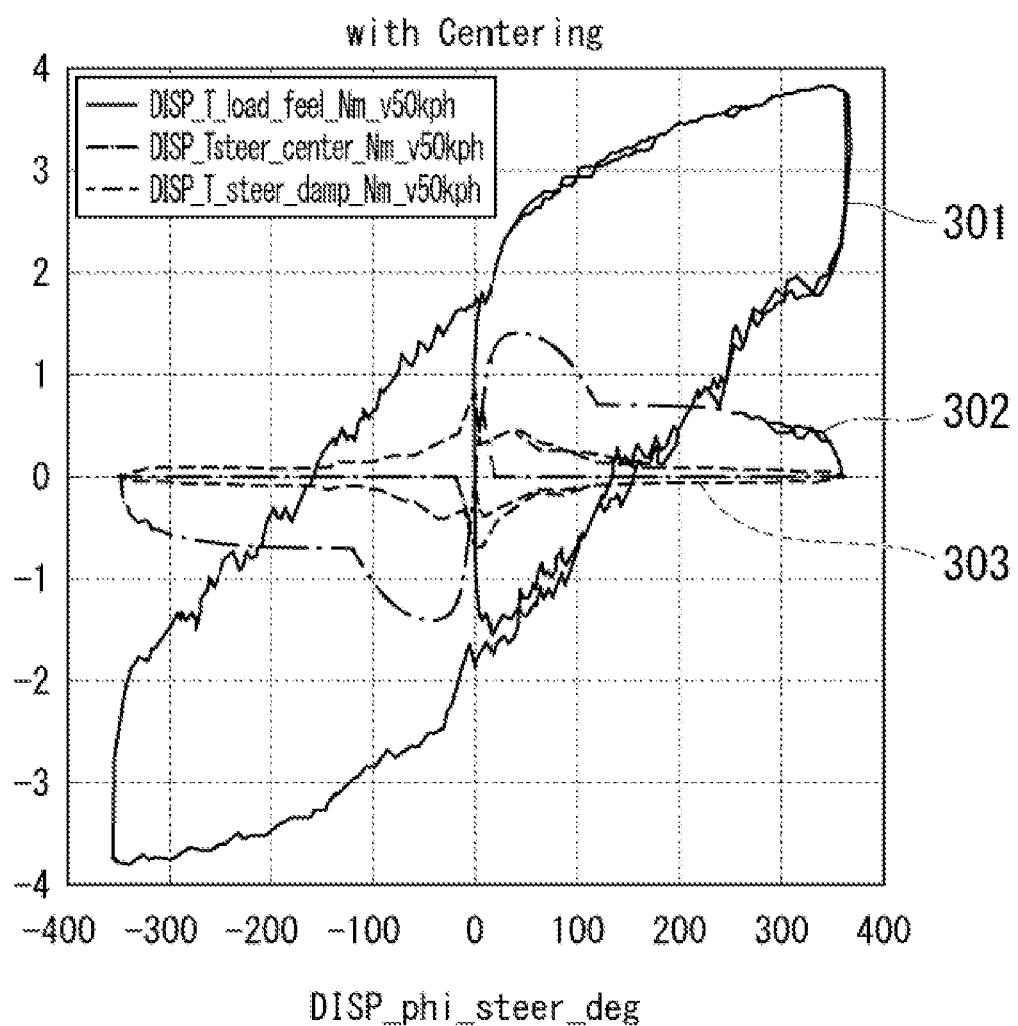
FIG. 3A is an explanatory diagram showing an example of torques outputted by units 202 to 204.
Figure 3B:
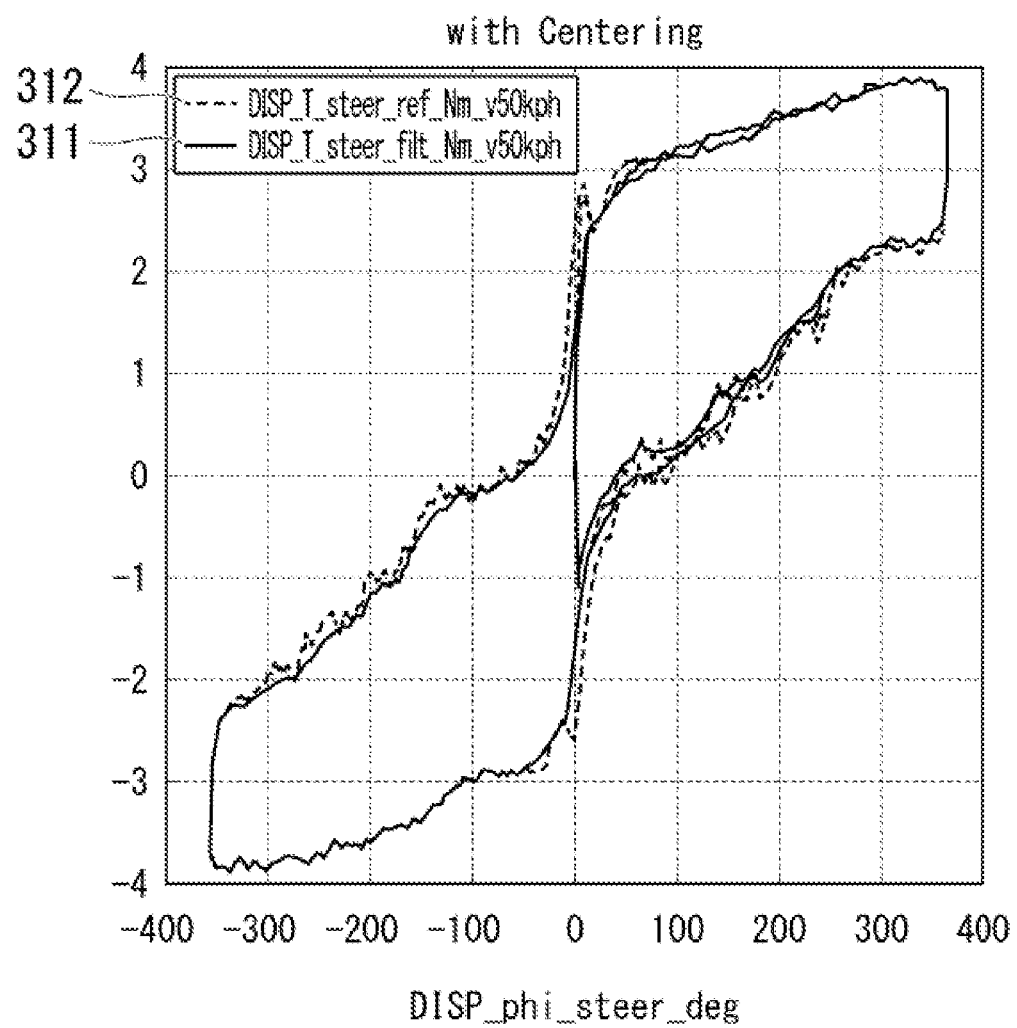
FIG. 3B is an explanatory diagram showing an example of torques outputted by the units 202 to 204.

FIGS. 3A and 3B are explanatory diagrams showing an example of torques outputted by the units 202 to 204. In FIGS. 3A and 3B, the horizontal axis indicates the steering angle $\varphi_{steer}$ (degree) of the steering wheel 101, and the vertical axis indicates the target steering torque $T_{steer\ ref}$. FIGS. 3A and 3B also shows a load feeling output 301, a centering output 302, and a damping output 303. In FIGS. 3A and 3B, the outputs 301 to 303 at a vehicle speed of 50 km/h are shown. The outputs 301 to 303 are prepared for each vehicle speed.

In FIG. 3A, the load feeling output 301 indicates the target value of the load feeling torque output by the load feeling unit 202. The load feeling output 301 shows that as the steering angle of the steering wheel 101 increases, the load feeling torque also increases. It also shows that as the steering angle of the steering wheel 101 decreases, the load feeling torque also decreases. That is, it shows that the assist torque increases as the driver turns the steering wheel at a larger angle.

The centering output 302 shows that the centering torque is increased when the load torque is small. This is because when the load torque is small, for example, when the steering angle is small, steering is easily affected by the back drive torque. This means that the steering wheel is more easily to return to the center position when the driver turns back the steering wheel.

The damping output 303 shows that a large torque is outputted when the steering angle is small. That is, it indicates that when an abrupt steering is performed by the driver at the start of steering, a repulsive torque makes the steering heavy. It also shows that when returning to the center position, the repulsive torque is generated causes the steering to gently move to the center position.

Figure 7:
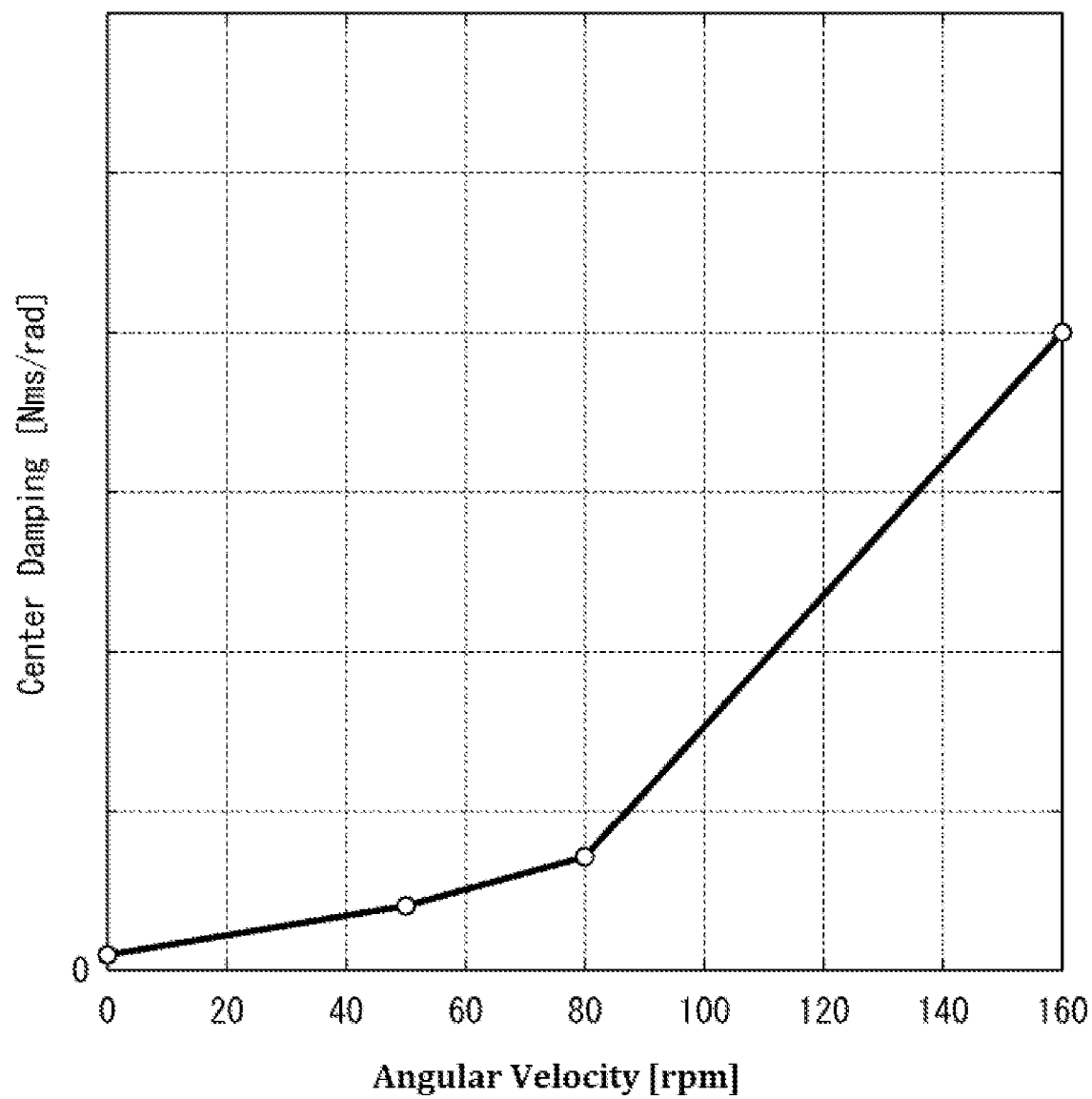
FIG. 7 is an explanatory diagram showing torque characteristics of resistance (steering heaviness) depending on a steering angular velocity.

FIG. 7 is an explanatory diagram showing torque characteristics of resistance (steering heaviness) dependent on the steering angular velocity. In FIG. 7, the horizontal axis indicates the steering angular velocity, and the vertical axis indicates a coefficient related to damping. As shown in FIG. 7, the coefficient related to damping increases as the steering angular velocity increases, that is, the damping torque increases. In this way, when the steering wheel 101 is abruptly turned, it is configured to generate an appropriate amount of steering heaviness.

Figure 8:
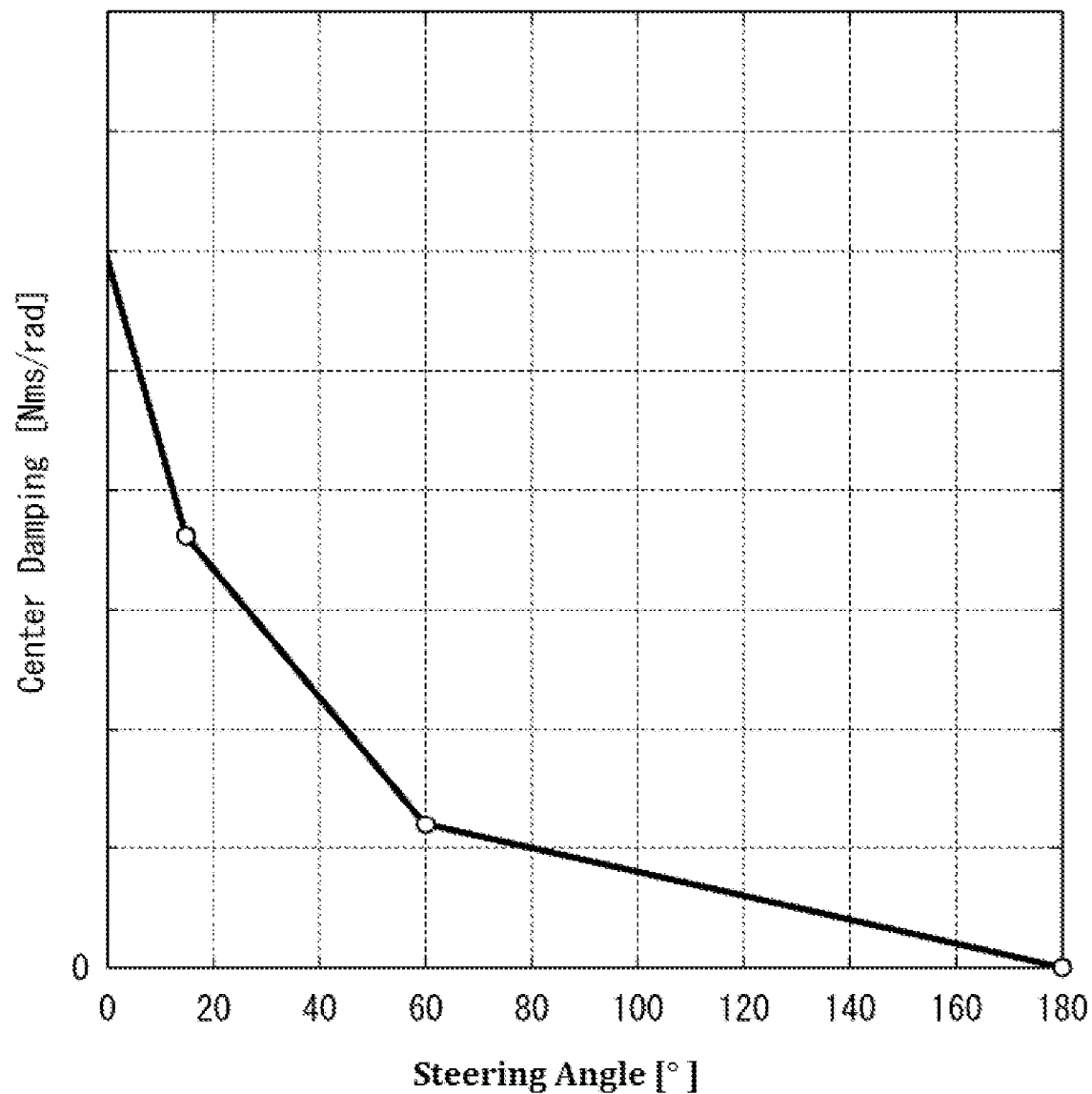
FIG. 8 is an explanatory diagram showing torque characteristics of brake when returning to the center position through centering torque (slow return to the center position).

FIG. 8 is an explanatory diagram showing torque characteristics of brake when returning to the center position through the centering torque (slow return to the center position). In FIG. 8, the horizontal axis indicates the steering angle, and the vertical axis indicates a coefficient related to damping. As shown in FIG. 8, the damping torque shows that as the steering angle of the steering wheel 101 approaches 0°, the coefficient related to damping increases, i.e., it generates a force in the opposite direction to that of the centering torque.

FIG. 3B shows a combined output of the outputs 301-303 of FIG. 3A. In FIG. 3B, output 311 shows a detected value of the steering torque by a sensor. The value shows a result of the control. Combined output 312 indicates the target steering torque $T_{steer\ ref}$ which is the combined output of the outputs 301 to 303. The feeling control unit 123 outputs, to the steering control unit 122, the target steering torque $T_{steer\ ref}$ obtained for the current vehicle speed.

<Example of Various Information Inputted to or Outputted from Steering Control Unit 122>

Referring again to FIG. 2, the steering control unit 122 will be now described. The steering control unit 122 includes a second estimation unit 211 and an assist unit 212. The steering angular velocity $\omega_{steer}$ (rad/s) and steering torque $T_{steer}$ (Nm) detected by the steering sensor 111 and the motor angular velocity $\omega_{mot}$ (rad/s) detected by the motor sensor 112 are inputted to the second estimation unit 211.

The second estimation unit 211 calculates various estimated values based on the inputted steering angular velocity $\omega_{steer}$, steering torque $T_{steer}$, and motor angular velocity $\omega_{mot}$. The various estimated values to be calculated include a value of the estimated steering torque $T_{driver\ est}$ pertaining to the driver and a value of the estimated load torque $T_{load\ est}$. The second estimation unit 211 outputs the various estimated values to the assist unit 212. The calculation (operation) of the various estimated values is described later.

The target steering torque $T_{steer\ ref}$ outputted by the feeling control unit 123 and the various estimated values outputted by the second estimation unit 211 are inputted to the assist unit 212. The assist unit 212 calculates a target motor torque $T_{mot\ ref}$ based on the inputted target steering torque $T_{steer\ ref}$ and various estimated values. The assist unit 212 outputs the calculated target motor torque $T_{mot\ ref}$ to the motor control unit 121. The motor control unit 121 causes the motor 102 to rotate at the target motor torque $T_{mot\ ref}$.

<Calculations Performed by Steering Control Unit 122>

Calculations performed by the steering control unit 122 are described. An electric portion of a physically equivalent linear model actuator reduced with two degrees of freedom may be expressed as a first-order element in a differential equation by the formula (1).

$$\tau_{cc} \cdot T\dot{T}_{mot} + T_{mot} = T_{mot\ ref} \quad \text{Formula 1}$$

In Formula 1, $\tau_{cc}$ is a current control loop, $T_{mot\_ref}$ is the target motor torque, and $T_{mot}$ is the resulting motor torque. A simplified dynamic behavior of a torque-controlled electric motor can be approximated by this formula. To describe mechanical components mathematically, the rotating masses of the systems belonging to the same degree of freedom needs to be reduced to a single mass on the motor side. The mechanical components can be represented by equations of motion expressed by Formulas 2 to 4.

$$j_{steer} \cdot \ddot{\varphi}_{steer} = T_{driver} - b_{steer} \cdot \dot{\varphi}_{steer} - T_{steer} \quad \text{Formula 2}$$

In Formula 2, $j_{steer}$ is inertia (moment of inertia) of the steering wheel 101 and $b_{steer}$ is damping of the steering wheel 101.

$$T_{steer} = c_{tb} \cdot (\varphi_{steer} - i_{pinion}/i_{rv,gear} \cdot \varphi_{mot}) + b_{tb} \cdot (\dot{\varphi}_{steer} - i_{pinion}/i_{rv,gear} \cdot \dot{\varphi}_{mot}) \quad \text{Formula 3}$$

In Formula 3, $c_{tb}$ is a linearized torsion bar stiffness of a steering column, $i_{pinion}$ is a gear ratio from the steering wheel to the pitman arm 104 (pinion gear ratio), $i_{rv,gear}$ is a gear ratio from the motor 102 to the pitman arm 104 (gear ratio of the speed reducer 103), and $b_{tb}$ is a torsion bar damping.

$$j_{red} \cdot \ddot{\varphi}_{mot} = T_{mot} - b_{red} \cdot \dot{\varphi}_{mot} - i_{pinion}/i_{rv,gear} \cdot T_{steer} - 1/i_{rv,gear} \cdot T_{load} \quad \text{Formula 4}$$

In Formula 4, $j_{red}$ is a moment of inertia converted in terms of the motor shaft, and $b_{red}$ is a damping converted in terms of the motor shaft.

By using the above Formulas 1 to 4, the steering control unit 122 can calculate an appropriate assist torque (target motor torque $T_{mot\_ref}$) with which the input steering results in the target steering torque.

Here, in general, a steering torque required for the input steering differs depending on driving conditions, road surface reaction force, and other factors. The steering feeling is determined by characteristics mainly based on the steering torque. Therefore, in order to facilitate adjustment of the steering feeling, it is desired to be able to control the steering at a predetermined steering torque $T_{steer}$. By designing a controller (Linear Quadratic Gaussian (LQG)) from the above formulas that take into account the torque applied to the pitman arm 104 when calculating the target motor torque $T_{mot\_ref}$, it is possible to realize the target steering torque $T_{steer\_ref}$ set for the specified steering even when the driving conditions or road surface conditions change.

<Estimation of Load Torque Applied to Pitman Arm 104>

The calculation of the load torque (estimated load torque $T_{load\_est}$) on the pitman arm 104 will be now described. For safety reasons, the driver usually drives while he/she feels the road surface conditions with the force returned to the steering wheel 101 that he/she operates. However, in the embodiment, the road surface reaction force is not transmitted to the driver due to the use of the speed reducer 103. Thus, it is necessary to configure the first estimator 201 to estimate the load torque (reaction force from the road surface) on the pitman arm 104 and return it such that the drive can feel the road reaction force. The road reaction force is the load torque applied to the pitman arm 104, but it is not a load directly applied by the road surface, but rather a load applied to the pitman arm 104 via the tires and drag rings. In typical electric power steering systems, there are no sensors to measure the road reaction force.

The estimation function of the embodiment is capable of estimating the reaction force from the road surface regardless of vehicle conditions (vehicle specifications, road surface conditions (inclination, road friction), etc.). The estimation function is implemented by an estimator (linear quadratic estimation (LQE)) designed with a Kalman filter based on Formulas 1 to 4. The estimation by the first estimator 201 can accurately estimate the torque applied to the pitman arm 104 by compensating for the characteristics of the speed reducer 103. The first estimation unit 201 may calculate the estimated load torque $T_{load\_est}$ based on Formulas 1 to 4. Since the pitman arm 104 is integrated with the output portion (case or shaft) of the speed reducer 103, it is possible to estimate the torque accurately.

<Compensation for Characteristics of Speed Reducer 103>

Compensation for the characteristics of the speed reducer 103 will be now described. The first estimation unit 201 compensates for the characteristics of the speed reducer 103 in the estimated load torque $T_{load\_est}$. This makes it possible to accurately estimate the torque applied to the pitman arm 104.

Note that the control of the feeling control unit 123 compensates for the characteristics of the speed reducer 103, while the control of the steering control unit 122 does not compensate for the characteristics of the speed reducer 103 in the embodiment. LQG is an equation using the load torque with the speed reducer friction as input. Therefore, the estimated $T_{load\_est}$ is the load torque including the friction torque. As for the torque outputted from the motor 102, it is necessary to instruct a motor torque corresponding to this load torque including the friction torque. That is, if the characteristics of the speed reducer 103 are compensated by the steering control unit 122, the outputted motor torque will become insufficient. On the other hand, for the estimation performed by the load feeling unit 202, it is necessary to know the more accurate load torque, i.e., the torque applied to the pitman arm 104 excluding the frictional torque of the speed reducer 103, in order to put the external force into the steering feeling. For this reason, the control of the feeling control unit 123 compensates for the characteristics of the speed reducer 103, while the control of the steering control unit 122 does not compensates for the characteristics of the speed reducer 103 in the embodiment.

The friction of the speed reducer 103 is calculated differently depending on the motor angular velocity $\omega_{mot}$. The friction of the speed reducer 103 can be obtained using the motor angular velocity $\omega_{mot}$ and the motor torque $T_{mot}$. The detected values of the speed reducers 103 may be for a viscous friction coefficient (see FIG. 6) for calculating the friction, and a load torque map (see FIG. 5).

Figure 5:
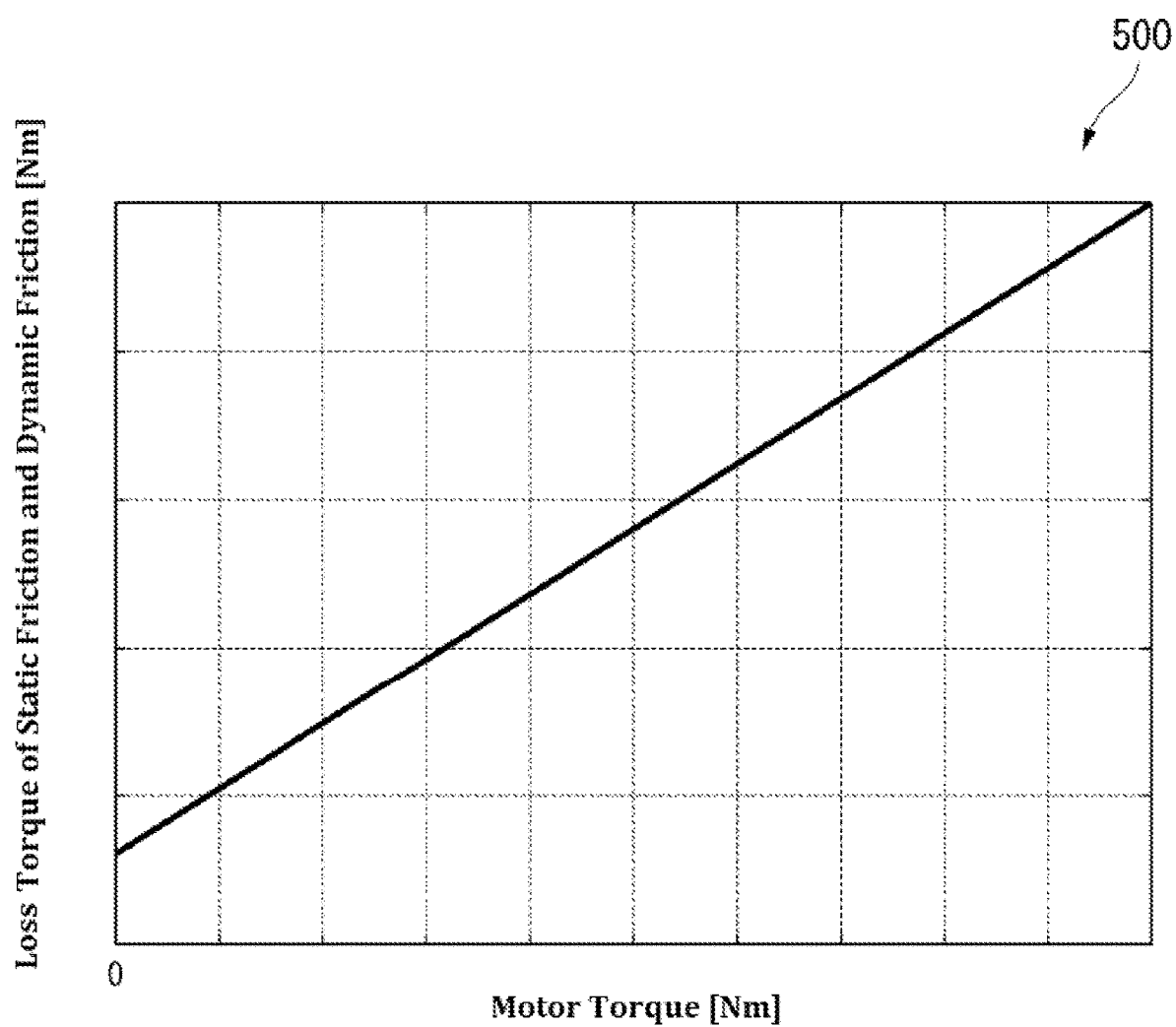
FIG. 5 is an explanatory diagram showing an example of a load torque map 500.

FIG. 5 is an explanatory diagram showing an example of a load torque map 500. The load torque map 500 is a map that shows how much torque is required for the motor torque $T_{mot}$ relation to the friction of the speed reducer 103. Specifically, as shown in FIG. 5, the load torque map 500 is a map in which the horizontal axis indicates the motor torque $T_{mot}$ and the vertical axis indicates a loss torque in static and dynamic friction. As shown in the load torque map 500, there is a proportional relationship between the motor torque $T_{mot}$ and the loss torque of the static and dynamic friction.

Figure 6:
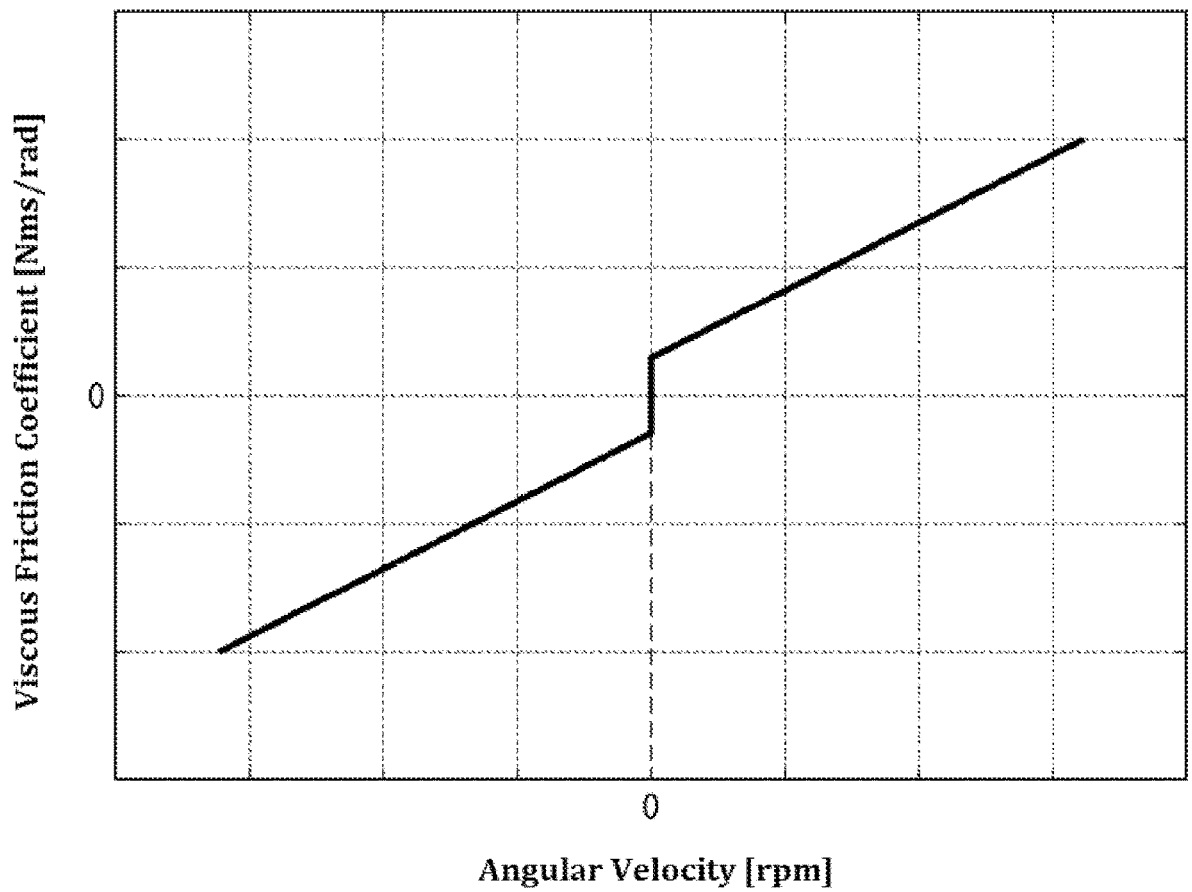
FIG. 6 is an explanatory diagram showing an example of a friction characteristic map 600.

FIG. 6 is an explanatory diagram showing an example of a friction characteristic map 600. The friction characteristic map 600 is a map that represents the friction characteristics of the speed reducer 103 in relation to the angular velocity of the pitman arm 104. Specifically, as shown in FIG. 6, the friction characteristic map 600 is the map in which the horizontal axis indicates the angular velocity [rpm] of the pitman arm 104 and the vertical axis indicates the viscous friction coefficient [Nms/rad]. As shown in the friction characteristic map 600, the angular velocity of the pitman arm 104 is proportional to the viscous friction coefficient except for the angular velocity of the pitman arm 104 is at a specific angular velocity (e.g., "0"). When the angular velocity of the pitman arm 104 is the specific angular velocity (e.g., "0"), the viscous friction coefficient can take multiple values. The motor angular velocity $\omega_{mot}$ can be obtained by multiplying the angular velocity of the pitman arm 104 by a predetermined speed ratio.

Compensation for the friction (load torque) of the speed reducer 103 is calculated differently depending on the states. For example, when the motor angular velocity $\omega_{mot}$ is "0" and the friction of the speed reducer 103 is greater than the external load torque, an external load torque $T_{ext}$ is used as a friction $T_{fr}$ of the speed reducer 103. When the motor angular velocity is "0" and the friction of the speed reducer 103 is less than the external load torque, the friction $T_{fr}$ of the speed reducer 103 is calculated from the load torque map 500 and the viscous friction coefficient. In this case, the direction of the force is the direction of the external load torque. When the motor angular velocity is not "0", the friction $T_{fr}$ of the speed reducer 103 is calculated from the load torque map 500 and the viscous friction coefficient. In this case, the direction of the force is the direction of rotation of the motor 102.

Formula 5 expresses a formula for calculating the friction.

$$T_{fr} = \begin{cases} T_{ext} & \dot{\varphi} = 0 \wedge |T_{ext}| \le (T_{fr,stat} + \mu_{load} \cdot T_{mot}) \\ (T_{fr,stat} + \mu_{load} \cdot |T_{mot}|) \cdot \text{sign}(T_{ext}) & \dot{\varphi} = 0 \wedge |T_{ext}| > (T_{fr,stat} + \mu_{load} \cdot T_{mot}) \\ (T_{fr,stat} + \mu_{load} \cdot |T_{mot}| + b \cdot |\dot{\varphi}|) \cdot \text{sign}(\dot{\varphi}) & \dot{\varphi} \neq 0 \end{cases}$$

Formula 5

In Formula 5, the first line represents a static friction torque when the friction torque and the external torque (without friction) are statically balanced. When the external torque is less than the static friction torque, sticking occurs at an angular velocity of "0". The second line of Formula 5 represents a frictional torque at the moment of breakaway when the external torque exceeds the static frictional torque. The third line represents a frictional torque calculated using the static frictional torque and the viscous friction dependent on the angular velocity. The friction characteristics in relation to the angular velocity can be obtained by using these equations.

By subtracting the friction $T_{fr}$ from the estimated load torque $T_{load\_est}$, the first estimator 201 can obtain an estimated load torque $T_{load\_est}$ that compensates for the characteristics of the speed reducer 103.

As discussed above, the steering unit device 100 in the embodiment estimates the target steering torque $T_{steer\_ref}$ based on the estimated load torque $T_{load\_est}$ corresponding to the road reaction force, and controls the rotation of the motor 102 to provide the estimated target steering torque $T_{steer\_ref}$. This allows the motor 102 to rotate at the target motor torque $T_{mot\_ref}$ that corresponds to the reaction force from the road surface. Therefore, the driver can drive with a desired steering torque regardless of the road surface conditions because the steering can be assisted with an appropriate assist torque. Consequently, the steering unit device 100 of the embodiment can convey the road reaction force correctly to the driver even when the friction of the speed reducer 103 is large, and it is possible to provide an excellent steering feel to the driver.

In the embodiment, the feeling control unit 123 calculates the estimated load torque $T_{load\_est}$ based on the steering torque $T_{steer}$ and steering angular velocity $\omega_{steer}$ detected by the steering sensor 111 and the motor torque $T_{mot}$. This makes it possible to easily calculate the estimated load torque $T_{load\_est}$ and thus easily obtain the target motor torque $T_{mot\_ref}$.

The steering control unit 122 is able to easily calculate the target motor torque $T_{mot\_ref}$ based on the target steering torque $T_{steer\_ref}$, the steering torque $T_{steer}$, the steering angular velocity $\omega_{steer}$, and the motor angular velocity $\omega_{mot}$.

The estimated load torque $T_{load\_est}$ is the torque applied onto the pitman arm 104. Therefore, a more accurate estimated load torque $T_{load\_est}$ can be obtained, which allows driving with more accurate steering torque.

In the embodiment, the feeling control unit 123 calculates the target steering torque $T_{steer\_ref}$ based on the load feeling torque, centering torque, and damping torque. Thus, the steering unit device 100 that allows easier steering can be provided.

In the embodiment, the feeling control unit 123 calculates the estimated load torque $T_{load\_est}$ to which the compensation operation for the friction of the speed reducer 103 has been made. This can reduce discomfort of the steering caused by the friction of the speed reducer 103.

Modification Examples of Embodiment

Modification examples of the embodiment will be now described below. In each of the following modification examples, description of the same components as the above-described embodiment will not be repeated. The following modification examples and the above-described embodiment may be combined adequately.

In a modification example, the steering unit device 100 has an angle detection unit 410 (see FIG. 4) that detects the rotation angle of the pitman arm 104. The angle detection unit 410 that detects the rotation angle of the pitman arm 104 is disposed between the pitman arm 104 and the motor 102. The angle detection unit 410 is disposed, for example, on one side of the fixed member 401 facing the speed reducer 103.

For example, the angle detection unit 410 is formed to extend in an arc shape along the circumferential direction of the output portion 402, viewed from the other surface 420 of the speed reducer 103 along the central axis (z-axis). The angle detection unit 410 is, for example, a magnetic sensor and detects the position of the output portion 402 of the pitman arm 104 in the circumferential direction based on variation in the magnetic field that changes depending on the position of the metal pitman arm 104.

This configuration allows the steering unit device 100 to perform the control in which the detection value of the rotation angle of the pitman arm 104, which has been detected by the angle detection unit 410, is compared with the command signal of the rotation angle of the motor 102 dependent on the rotation angle of the pitman arm 104 and the deviation indicating the result of the comparison is set to zero.

In another modification example, the rotation angle of the pitman arm 104 detected by the angle detection unit 410 may be used instead of or in addition to the steering angle provided by the steering sensor 111. The rotation angle of the pitman arm 104 may be corrected to be consistent with the steering angle outputted by the steering sensor 111. The rotation angle of the pitman arm 104 may be used by the centering unit 203 and the damping unit 204 to obtain respective values.

Specifically, the centering unit 203 may obtain a target value of the centering torque based on the steering angle detected by the angle detection unit 410, the steering torque detected by the steering sensor 111, and the speed detected by the speed sensor 113. The damping unit 204 may obtain a target value of the damping torque based on the steering angle detected by the angle detection unit 410, the steering angular velocity detected by the angle detection unit 410, and the speed detected by the speed sensor 113.

In this way, the invention can be applied to the speed reducer 103 equipped with the angle detection unit 410. The steering unit device 100 of the modification examples can also assist steering with an appropriate assist torque, so that the driver can drive with a predetermined steering torque regardless of road conditions.

In the embodiments described above, each control unit (the motor control unit 121, the steering control unit 122, the feeling control unit 123) and the functional units in each control unit (the first estimation unit 201, the load feeling unit 202, the centering unit 203, the damping unit 204, the second estimation unit 211, the assist unit 212) are provided in a single computer device. However, they may be provided in other computer devices. For example, they may be provided on an external server. In addition, the number of the computer device in which these units are provided is not limited to one, but may be two or more. Specifically, for example, some of these functional units may be provided in one computer device and other functional units may be provided in other computer device(s).

A program for realizing the steering unit device 100 described above may be stored on a computer-readable storage medium, and the program may be loaded to a computer system to execute the program. The term "computer system" as used herein includes hardware such as an OS and peripheral devices. The "computer-readable storage medium" refers to a storage device such as portable medium including a flexible disc, a magneto-optical disc, a ROM, and a CD-ROM, and a hard disk built-in to the computer system. Further, the "computer-readable storage medium" includes storage that retain the program for some period of time, like a volatile memory (for example, RAM) in a computer system that operates as a server or a client receiving the program through a network such as the Internet or a communication line such as a telephone line. The computer program mentioned above may be transmitted from a computer system that includes a storage device or the like storing the program to another computer system through a transmission medium or by a transmission wave in a transmission medium. The "transmission medium" for transmitting the program refers to a medium that operates to transmit information, like a network (communication network) such as the Internet or a communication line (communication wire) such as the telephone line. Only a part of the functions described above may be implemented in the above program. Further, the functions described above may be implemented by a combination of the above program and other programs previously stored on the computer system. That is, the above program may be what is called a difference file (a difference program).

LIST OF REFERENCE NUMBERS

100 . . . steering unit device, 101 . . . steering wheel, 102 . . . motor, 103 . . . speed reducer, 104 . . . pitman arm, 111 . . . steering sensor, 112 . . . motor sensor, 113 . . . speed sensor, 121 . . . motor control unit, 122 . . . steering control unit, 123 . . . feeling control unit, 201 . . . first estimation unit, 202 . . . load feeling unit, 203 . . . centering unit, 204 . . . dumping unit, 211 . . . second estimation unit, 212 . . . assist unit

What is claimed is:

1. A column assist steering device, comprising:
a steering member steered by an operator;
a drive unit configured to rotate for imparting an auxiliary force to the steering member;
a first control unit configured to calculate a load torque that corresponds to a reaction force from a road surface, the load torque being estimated based on a value measured in the steering member and the drive unit, the first control unit also configured to calculate a target steering torque for the steering member based on the calculated load torque; and
a second control unit configured to calculate the auxiliary force of the drive unit to achieve the target steering torque calculated by the first control unit;
wherein the first control unit is configured to calculate a steering torque that corresponds to the reaction force based on the load torque and a vehicle speed, calculate a restoring torque that returns the steering member to its neutral position and a damping torque that controls abrupt steering of the steering member based on the vehicle speed, and calculate the target steering torque based on the calculated torques,
wherein the first control unit is configured to calculate the load torque on which an operation of compensating for a friction of a speed reducer has been performed, and
wherein the second control unit is configured to not compensate for the friction of the speed reducer, and so as not to input the vehicle speed thereinto.

2. The column assist steering device of claim 1, wherein the first control unit is configured to calculate the load torque based on a steering torque required to rotate the steering member, a steering angular velocity, which is an angular velocity of the steering member, and a drive torque, which is a torque of the drive unit.

3. The column assist steering device of claim 1, wherein the second control unit is configured to calculate the auxiliary force of the drive unit based on the load torque, a steering torque required to rotate the steering unit, a steering angular velocity, which is an angular velocity of the steering member, and a drive angular velocity, which is an angular velocity of the drive unit.

4. The column assist steering device of claim 1, wherein the load torque is a torque applied to a pitman arm.

5. The column assist steering device of claim 1, wherein the load torque, on which the operation of compensating for the friction of the speed reducer has been performed, is obtained by subtracting a friction torque of the speed reducer from the load torque.

6. A steering unit, comprising:
a column assist steering device;
a speed reducer; and
a control device configured to control the column assist steering device and the speed reducer;
wherein the column assist steering device includes:
a steering member steered by an operator;
a drive unit configured to rotate for imparting an auxiliary force to the steering member;
a first control unit configured to calculate a load torque that corresponds to a reaction force from a road surface, the load torque being estimated based on a value measured in the steering member and the drive unit, the first control unit also configured to calculate a target steering torque for the steering member based on the calculated load torque; and a second control unit configured to calculate the auxiliary force of the drive unit to achieve the target steering torque calculated by the first control unit, wherein the first control unit is configured to calculate a steering torque that corresponds to the reaction force based on the load torque and a vehicle speed, calculate a restoring torque that returns the steering member to its neutral position and a damping torque that controls abrupt steering of the steering member based on the vehicle speed, and calculate the target steering torque based on the calculated torques, wherein the first control unit is configured to calculate the load torque on which an operation of compensating for a friction of a speed reducer has been performed, and wherein the second control unit is configured to not compensate for the friction of the speed reducer, and so as not to input the vehicle speed thereinto.

7. The steering unit of claim 6, wherein the load torque, on which the operation of compensating for the friction of the speed reducer has been performed, is obtained by subtracting a friction torque of the speed reducer from the load torque.

8. A method of calculating an auxiliary force performed by executing computer readable instructions by one or more computer processors of a column assist steering device that includes a steering member steered by an operator and a drive unit configured to rotate for imparting the auxiliary force to the steering member, the method comprising:

a first control step of calculating a load torque that corresponds to a reaction force from a road surface, the load torque being estimated based on a value measured in the steering member and the drive unit, and calculating a target steering torque for the steering member based on the calculated load torque; and a second control step of calculating the auxiliary force of the drive unit to achieve the target steering torque calculated in the first control step, wherein, in the first control step, a steering torque that corresponds to the reaction force is calculated based on the load torque and a vehicle speed, a restoring torque that returns the steering member to its neutral position and a damping torque that controls abrupt steering of the steering member are calculated based on the vehicle speed, and the target steering torque is calculated based on the calculated torques, wherein, in the first control step, the load torque on which an operation of compensating for a friction of a speed reducer has been performed is calculated, and wherein, in the second control step, no operation of compensating for the friction of the speed reducer is performed, and the auxiliary force of the drive unit is calculated without using the vehicle speed.

9. The method of calculating an auxiliary force of claim 8, wherein the load torque, on which the operation of compensating for the friction of the speed reducer has been performed, is obtained by subtracting a friction torque of the speed reducer from the load torque.

10. A tangible computer-readable non-transitory storage medium comprising executable instructions that, when executed, cause one or more computer processors of a column assist steering device that includes a steering member steered by an operator and a drive unit rotating for imparting the auxiliary force to the steering member, to perform:

a first control step in which a load torque that corresponds to a reaction force from a road surface is calculated, the load torque being estimated based on a value measured in the steering member and the drive unit, and a target steering torque for the steering member is calculated based on the calculated load torque; and a second control step in which the auxiliary force of the drive unit is calculated to achieve the target steering torque calculated in the first control step, wherein, in the first control step, a steering torque that corresponds to the reaction force is calculated based on the load torque and a vehicle speed, a restoring torque that returns the steering member to its neutral position and a damping torque that controls abrupt steering of the steering member are calculated based on the vehicle speed, and the target steering torque is calculated based on the calculated torques, wherein, in the first control step, the load torque on which an operation of compensating for a friction of a speed reducer has been performed is calculated, and wherein, in the second control step, no operation of compensating for the friction of the speed reducer is performed, and the auxiliary force of the drive unit is calculated without using the vehicle speed.

11. The tangible computer-readable non-transitory storage medium of claim 10, wherein the load torque, on which the operation of compensating for the friction of the speed reducer has been performed, is obtained by subtracting a friction torque of the speed reducer from the load torque.

12. A column assist steering device, comprising:

a steering member steered by an operator;

a drive unit configured to rotate for imparting an auxiliary force to the steering member;

a first control unit configured to calculate a load torque that corresponds to a reaction force from a road surface, the load torque being estimated based on a value measured in the steering member and the drive unit, the first control unit also configured to calculate a target steering torque for the steering member based on the calculated load torque; and a second control unit configured to calculate the auxiliary force of the drive unit to achieve the target steering torque calculated by the first control unit, wherein the first control unit is configured to calculate the load torque that is a load torque applied on a pitman arm and has been compensated for friction of a speed reducer based on a steering torque required to rotate the steering member, a steering angular velocity which is an angular velocity of the steering member, and a drive torque which is a torque of the drive unit, wherein the first control unit is configured to calculate a steering torque that corresponds to the reaction force based on the load torque and a vehicle speed, calculate a restoring torque that returns the steering member to its neutral position and a damping torque that controls abrupt steering of the steering member based on the vehicle speed, and calculate the target steering torque based on the calculated torques, wherein the second control unit is configured to calculate the auxiliary force of the drive unit based on the load torque, the steering torque required to rotate the steering member, the steering angular velocity which is the angular velocity of the steering member, and a drive angular velocity which is an angular velocity of the drive unit, and wherein the second control unit is configured to not compensate for the friction of the speed reducer, and so as not to input the vehicle speed thereinto.

13. The column assist steering device of claim 12, wherein the load torque, on which the operation of compensating for the friction of the speed reducer has been performed, is obtained by subtracting a friction torque of the speed reducer from the load torque.

* * * * *